(12) United States Patent
Natale et al.

(10) Patent No.: US 6,708,986 B2
(45) Date of Patent: Mar. 23, 2004

(54) DEVICE AND METHOD FOR DUCTS SEALING

(75) Inventors: Giuseppe Natale, Casagione (IT); Xinsheng Bian, Cassino (IT)

(73) Assignee: Megarad Srl, Rome (IT)

( * ) Notice: Subject to any disclaimer, the term of this patent is extended or adjusted under 35 U.S.C. 154(b) by 0 days.

(21) Appl. No.: 10/073,921

(22) Filed: Feb. 14, 2002

(65) Prior Publication Data

US 2002/0084590 A1 Jul. 4, 2002

(51) Int. Cl.[7] .................................................. F16J 15/48
(52) U.S. Cl. ........................ 277/646; 277/314; 277/315; 277/605
(58) Field of Search ................................. 277/314, 315, 277/602, 605, 648, 646; 174/17.05, 17 GF

(56) References Cited

U.S. PATENT DOCUMENTS

| | | | | |
|---|---|---|---|---|
| 3,038,732 A | * | 6/1962 | Scott et al. ................... | 277/605 |
| 3,222,076 A | * | 12/1965 | Hollingswoth ............... | 277/605 |
| 4,790,544 A | * | 12/1988 | Kemp ........................ | 277/314 |
| 5,562,295 A | * | 10/1996 | Wambeke et al. ........... | 277/605 |
| 5,979,909 A | * | 11/1999 | Wambeke .................... | 277/605 |

* cited by examiner

Primary Examiner—Anthony Knight
Assistant Examiner—E Peavey
(74) Attorney, Agent, or Firm—Breiner & Breiner, L.L.C.

(57) ABSTRACT

This invention relates to a device a metod for ductchs sealing composed by a sealed bag, with no valve and or accesses, divided by a separator device wich can be un-welded before the application, containing separated chemical substances able to react and generate gas or any other action able to generate an inner pressure into the bag.

10 Claims, 1 Drawing Sheet

DEVICE AND METHOD FOR DUCTS SEALING

TECHNICAL FIELD

This invention relates to a multi-layer bag composed of thermoplastic layers joined by suitable adhesive and metallic layers having a barrier function when used in cable duct sealing.

BACKGROUND OF INVENTION

It is normal procedure in energy or telecom cable networks to be equipped with cabinets for cables and/or equipment connections. These cabinets can be placed underground and, since the cables are generally laid underground, they are exposed to water and moisture penetration.

Plastic ducts are generally installed in cabinets to allow the cables to pass through a wall.

These plastic ducts, may become openings, in addition for water and moisture, for gas leakages from the gas distribution networks. These leakages can saturate a room and may be the cause of serious hazard.

Therefore, the problem of cable duct sealing is very important. Different systems have been used in the past, mainly based upon sealing materials applications, without providing satisfactory solutions due to environmental stresses like thermal variations and mechanical stresses like pull and torsion to which cables and the whole system are subject to during the exercise.

Recently a system, so-called active, is becoming popular. It is made by a bag inflatable at convenient pressure levels. This bag is placed between the cable and the duct and once inflated, seals by means of pressure the duct free spaces to keep a constant mechanical action against the elements and to absorb the mechanical stresses.

The bag, made by a suitable multi-layer, is sealed at the edges and is equipped with a valve for the inflation. The layers composing the bag have different characteristics due to their different functions, like pressure-withstanding or waterproofing. The valve is provided with a small cannula to allow for inflation, once installed in a duct.

Moreover, as the inner duct surfaces may present some irregularities on the walls, it is convenient to apply all along the bag a piece of sealant mastic tape. An efficient sealing is granted by the above-mentioned mastic tape when compressed by the bag against the cable and duct walls. The active system above-described, however, presents some weak points. Among them, the need of a compressor in loco for air inflation, or a pressurized tank in case of using gases different from air.

Moreover, inflation should be made after placing the bag in the duct, using the above-mentioned cannula which is often in an inconvenient position which could affect the correct positioning of the bag inside the duct. The subject of the present invention is a multi-layer bag composed by thermoplastic layers joined by suitable adhesives and metallic layers having a barrier function, which is able to eliminate the inconveniences previously described.

BRIEF DESCRIPTION OF THE DRAWING

The invention will be described, in one preferred form, with reference to the enclosed figures in which.

DETAILED DESCRIPTION OF THE INVENTION

According to the invention the bag (1) is provided with a "separator" (2) positioned in the middle or, even not necessarily in the middle of the bag, to divide the same bag into two water-tight, separated chambers (3–4).

During the manufacturing operations, some solid and/or liquid chemical substances suitably formulated and proportioned, are included in the chambers (3–4) of the bags (1).

After the edges are soldered, the bag (1) will be ready to be used, completely sealed, composed by two parts, hermetically divided by the "separator" (2) and filled with chemical pre-proportioned substances.

Figure 1:
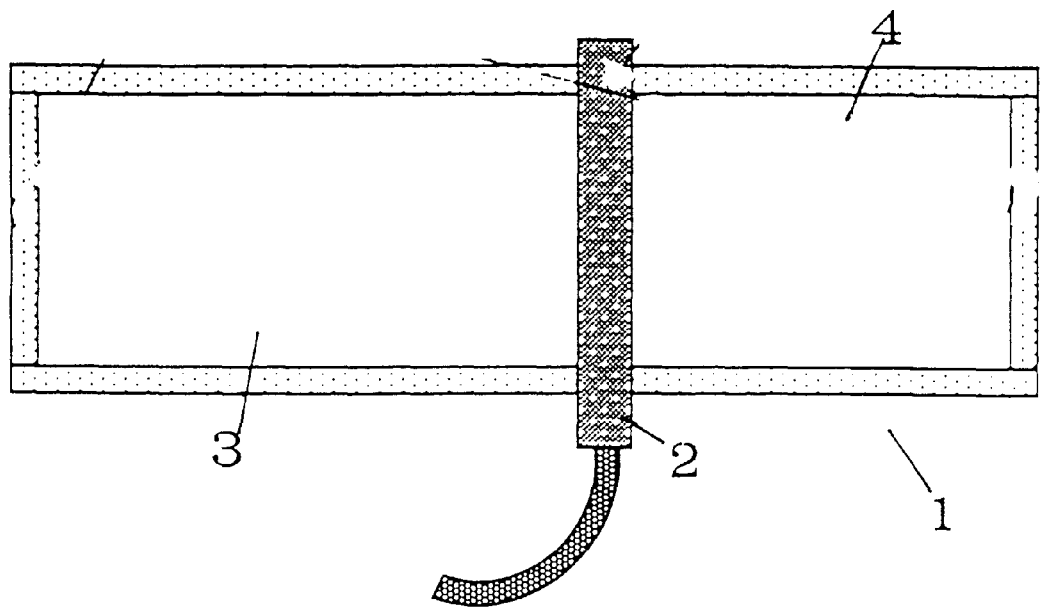
FIG. 1 shows the multi-layer bag as well the separator septum.
Figure 2:
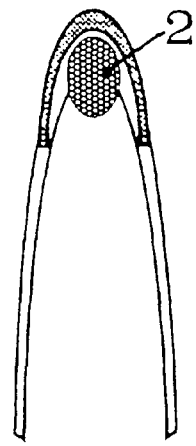
FIG. 2 shows the multi-layer bag folded as well the separator septum.

Before the installation of the bag, the separator (2) will be removed, and the chemical substances will come into contact, producing, through their reaction, in a predesigned time schedule, a quantity of gas which will inflate the bag, until the prescribed pressure is exactly reached. Another system, even preferred, is the one using a double bag. It consists of an inner bag, which contains expanding substances, positioned inside an outer multi-layer bag. Both of them are duly soldered at the edge, and provided with an outer separator device, as per FIG. 1, to keep the two parts of the inner bag containing the reacting substances hermetically separated. When removing the separator septum, the expanding substances will start reacting in the sole inner bag, which will be pressurized.

A suitable dimensioning of both bags will control the pressure effects on the metallic un-extendable shielding layer of the multi-layer outer bag. Another system could, for instance, be realized with a unique bag having no separator septum, but containing a smaller bag inside which is designed to be broken by hands. The outer bag will contain one of the chemical reacting substances and the inner bag will be filled with the second reacting agent. Pressure exercised manually by the operator on the outer surface of the bag will break the inner bag and all the reacting substances will come in contact generating the inflating reaction described above.

This last system, however, seems not to be preferred as the inner bag could become split by accidental causes, i.e. during transportation, and start a premature reaction.

This description shows by itself both advantages in costs and operations. Advantages in costs are mainly based on the bag costs. Our bag, in fact, does not require an incorporated soldered valve.

Operating advantages are granted because there is no longer any need for a compressor or pressurized tank. Further, there is no need to control pressure levels during the installation operations.

Chemical substances used preferably in this invention are:

Bicarbonate metals and generic metallic acid salts;

$C_2$–$C_8$ organic acids;

Organic, inorganic and aqueous accelerating agents; and

Organic or inorganic diluents.

These components are particularly preferred because they do not produce harmful gases. However, any other substance suitable for producing by chemical reaction a gas with a pressure between 2 and 5 atm could be used.

The system above described can be extended to different applications, such as replacement of polluting gases to be used as propellant. Our system, in fact, suitably dimensioned is able to apply a constant pressure without environmental hazard.

What is claimed is:

1. Device for sealing a duct comprising a sealed bag without a valve therein, divided by a separator into two water-tight chambers wherein each of the two chambers contains a different chemical substance which is reactive with each other to generate a gas upon reaction to provide an inner pressure of 200–500 kPa in the bag to inflate the bag over a predetermined time schedule.

2. Device according to claim 1, wherein each of the different chemical substance is selected from the group consisting of bicarbonate metals or generic metallic salts; $C_{2-8}$ organic acids; organic, inorganic or aqueous accelerating agents; and organic or inorganic diluents.

3. Device according to claim 1, wherein the gas is non-toxic and non-polluting.

4. Device according to claim 1, wherein said duct is a cable duct.

5. Device according to claim 1, wherein the device acts as a pressure propellent.

6. Device for sealing a duct comprising a water-tight outer sealed bag forming a first inner compartment containing a first chemical, a rupturable inner sealed bag forming a second inner compartment containing a second chemical, wherein said inner sealed bag is contained in said outer sealed bag, wherein said first chemical and said second chemical are different from each other and reactive with each other when mixed together to generate a gas to provide an inner pressure of 200–500 kPa to inflate said outer sealed bag over a predetermined time schedule and to seal a duct with the outer bag, and wherein said device is free of a valve therein.

7. Device according to claim 6, wherein said first chemical and said second chemical are selected from the group consisting of bicarbonate metals or generic metallic salts; $C_{2-8}$ organic acids; organic, inorganic or aqueous accelerating agents; and organic or inorganic diluents.

8. Device according to claim 6, wherein the gas is non-toxic and non-polluting.

9. Device according to claim 6, wherein said duct is a cable duct.

10. Device according to claim 6, wherein the device acts as a pressure propellent.

* * * * *